US008054576B2

(12) United States Patent
Bui et al.

(10) Patent No.: US 8,054,576 B2
(45) Date of Patent: Nov. 8, 2011

(54) SKEW ACTUATOR TO SERVO TRACK ZERO REFERENCE (75) Inventors: Nhan Xuan Bui, Tucson, AZ (US);
Reed Alan Hancock, Tucson, AZ (US);
Randy Clark Inch, Tucson, AZ (US);
Kevin Bruce Judd, Tucson, AZ (US);
Kazuhiro Tsuruta, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 12/707,316

(22) Filed: Feb. 17, 2010

(65) Prior Publication Data
US 2011/0199701 A1 Aug. 18, 2011

(51) Int. Cl.
*G11B 5/584* (2006.01)
*G11B 20/20* (2006.01)
(52) U.S. Cl. ........................ 360/77.12; 360/76
(58) Field of Classification Search .................. None
See application file for complete search history.

(56) References Cited

U.S. PATENT DOCUMENTS

| | | | |
|---|---|---|---|
| 4,414,587 A | 11/1983 | Weaver et al. | 360/76 |
| 4,866,548 A | 9/1989 | Rudi | 360/77.02 |
| 5,488,525 A | 1/1996 | Adams et al. | 360/104 |
| 5,600,505 A | 2/1997 | Ayres | 360/77.12 |
| 6,222,698 B1 | 4/2001 | Barndt et al. | 360/76 |
| 6,307,718 B1 | 10/2001 | Kasetty | 360/291.1 |
| 6,580,581 B1 | 6/2003 | Bui et al. | 360/78.02 |
| 6,724,559 B1 | 4/2004 | Konishi et al. | 360/76 |
| 6,751,042 B2 | 6/2004 | Bi et al. | 360/77.02 |
| 7,436,621 B2 | 10/2008 | Goker et al. | 360/76 |
| 7,529,061 B2 | 5/2009 | Bui et al. | 360/77.12 |
| 7,538,966 B2 | 5/2009 | Day | 360/76 |
| 7,764,460 B2 * | 7/2010 | Bates et al. | 360/77.12 |
| 2002/0163752 A1 * | 11/2002 | Peterson | 360/76 |
| 2006/0103968 A1 | 5/2006 | Jurneke | 360/76 |
| 2009/0116140 A1 | 5/2009 | Harper | 360/77.12 |

* cited by examiner

*Primary Examiner* — Andrew L Sniezek
(74) *Attorney, Agent, or Firm* — John H. Holcombe (57) ABSTRACT

A servo detection system for detecting servo tracks of a longitudinal tape. In a read/write head, two servo read heads are spaced laterally on a first head module, and a servo read head is on a second head module spaced longitudinally from the first module. A method comprises initially sensing a tape servo track with one servo read head of the first module and the servo read head of the second module to determine skew misalignment of the servo track. A zero reference value is stored representing the determined skew misalignment. The detection system switches from the one servo read head of each module, to the two servo read heads of the first module, and employs the stored value to position the read/write head in the zero skew position. The two servo read heads are then employed to read two servo tracks to identify the data band and to control skew.

25 Claims, 7 Drawing Sheets

SKEW ACTUATOR TO SERVO TRACK ZERO REFERENCE

DOCUMENT INCORPORATED BY REFERENCE

Commonly assigned U.S. patent application Ser. No. 11/933,966, Filed Nov. 1, 2007 (U.S. Patent Application Publication 2009/0116140), is incorporated for its showing of a system for adjusting for skew misalignment between a read/write head and a longitudinal data storage medium.

FIELD OF THE INVENTION

This invention relates to servoing a read/write head with respect to longitudinal servo tracks employed in a longitudinal tape, for example, in magnetic tape, and more particularly to determining skew of the servo tracks and therefore the tape.

BACKGROUND OF THE INVENTION

The function of a servo system for longitudinal tape, such as magnetic tape, is to move a head laterally of the longitudinal tape to accurately follow the lateral movement of the tape, for example, during read/write operations of the head. If done accurately, the data tracks are written and read by a read/write head in straight lines along the longitudinal tape as the tape is driven in the longitudinal direction. With respect to magnetic tape, the data comprises parallel stripes in the longitudinal direction of the magnetic tape. Servo tracks are prerecorded in the magnetic tape parallel to, and laterally offset from, the expected data stripes. The servo tracks are typically provided at separate lateral locations across the magnetic tape so that the magnetic tape may comprise many servo tracks and many sets of data bands. Servo heads, typically at opposite ends of a head module of the read/write head, sense two servo tracks and control the lateral positioning of the read/write head to track follow the servo tracks. The read/write head is shifted laterally across a set of servo tracks to shift between data tracks of a data band, and is shifted from one set of servo tracks to another to shift between data bands.

Embodiments of servo tracks may comprise longitudinal tracks arranged in sequential repeating patterns, one example comprising timing based servo tracks, and the patterns of the respective servo tracks are longitudinally offset from each other to allow a determination of the gross lateral position of the servo heads and the data band at which the magnetic head is positioned by measuring the longitudinal offset between the two servo tracks. Once the longitudinal offset of the servo tracks as sensed by the servo heads at opposite ends of the head module are known and therefore the data band is known, the relative measurement of the timing of the servo tracks as compared with the known longitudinal offset provides a measurement of the skew of the tape with respect to the read/write head, which can be compensated for, for example, by tilting the read/write head.

Typically, the lateral movement of the tape is constrained by flanges present on tape guides at either side of the head, such that the servo system causes the head to follow the data stripes in the presence of disturbances mainly created from limited lateral motion of the tape, called LTM (Lateral Tape Motion).

The flanges of the tape path, such as rollers, limit the lateral motion of the tape, but may tend to flex the tape and to introduce debris accumulation in the flanges that impact the lifetime of the tape and in addition create undesirable dynamic effects.

A flangeless tape path tends to solve the problems of the flanged tape path, but, without being constrained, the longitudinal tape tends to rapidly shift from one side of a tape path to the other, and it may run at one side of the path for only a short period.

The shift at a tape path at one side of a read/write head may be to the opposite side of the path which is at the other side of the read/write head, introducing substantial skew of the longitudinal tape.

Skew may be determined by measuring the longitudinal offset between servo tracks sensed by servo heads at the upper and lower ends of the tape head module. However, the servo tracks may be longitudinally offset at the manufacture of the tape to indicate the data band at which the read/write head is positioned. The skew due to a flangeless tape path may be such that it offsets or enhances the manufactured longitudinal offset of the servo tracks, inhibiting the ability to determine the gross lateral positioning (which servo tracks) of the read/write head. Incorrect or unknown gross lateral positioning, in turn, inhibits the ability to employ the use of the servo heads to measure the skew of the tape with respect to the read/write heads, since the zero skew position of the servo tracks is unknown.

The servo skew actuator may have built in biases that cause the read/write head to be in a non-ideal position relative to the servo tracks as a tape is initially moved with respect to the read/write head, for example, when a magnetic tape cartridge is loaded into a data storage drive and the tape is moved across the read/write head. These biases can be caused by the effects of flex cable bias, from biases caused by gravity on the actuator mechanism, from external forces of shock and vibration, and from tape motion forces on the read-write head.

SUMMARY OF THE INVENTION

Methods, servo systems, servo detection systems, and data storage drives are provided for detecting servo tracks of a longitudinal tape.

In one embodiment, wherein the servo detection system comprises at least two servo read heads spaced laterally on a first head module of a read/write head, and at least one servo read head on a second head module of the read/write head spaced longitudinally with respect to the first head module, a method comprises:

initially sensing a servo track of the longitudinal tape, employing one servo read head of the first head module and the servo read head of the second head module to detect lateral position difference between the servo read heads with respect to the servo track, and calibrating skew misalignment of the servo track with respect to the read/write head;

storing a value representing the calibrated skew misalignment as a zero reference value; and switching from the one servo read head of the first head module and the servo read head of the second head module, to the two servo read heads of the first head module.

In a further embodiment, the calibrated zero reference value is related to the detected lateral position difference.

In a further embodiment, a signal is provided to operate a skew actuator for tilting the head modules to adjust the sensed skew misalignment to zero, and wherein the value of the calibrated zero reference value is related to the value of the skew actuator signal.

In a still further embodiment, the skew actuator signal zero reference value is employed as a servo offset to operate the skew actuator in response to skew sensed by the two servo read heads of the first head module.

In another embodiment, wherein the servo tracks are longitudinally offset with respect to each other, the method comprises adjusting sensed skew applying the calibrated zero reference value, and the servo track longitudinal offset is employed to determine the servo tracks and data band at which the first head module is positioned.

In a further embodiment, if the servo track longitudinal offset is determined to be less than the maximum longitudinal offset of the servo tracks, the read/write head is repositioned laterally to another set of servo tracks.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
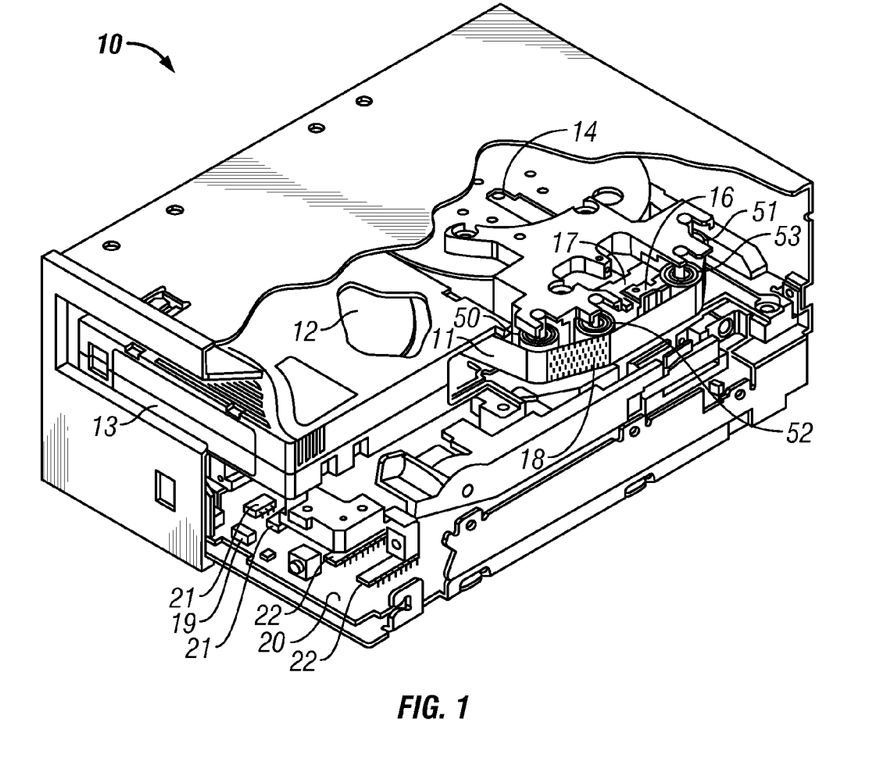
FIG. 1 is a partially cut away view of an exemplary magnetic tape data storage drive which may implement aspects of the present invention.

FIG. 1 illustrates an example of a tape data storage drive 10 which writes data 18 to and reads data from longitudinal tape 11, for example, magnetic tape data storage media. As is understood by those of skill in the art, tape data storage drives, also known as magnetic tape drives or tape drives, may take any of various forms. The illustrated tape data storage drive 10 moves the longitudinal tape 11 along a tape path in the longitudinal direction of the tape from a supply reel 12 in a tape data storage cartridge 13 to a take up reel 14. An example of a magnetic tape drive is the IBM® LTO (Linear Tape Open) magnetic tape drive. The exemplary magnetic tape drive employs a single reel tape cartridge 13. An alternative tape drive and tape cartridge are a dual reel cartridge and drive in which both reels 12 and 14 are contained in the cartridge.

The longitudinal tape 11 is moved in the longitudinal direction across a tape head 16. The tape head may be supported, laterally moved, and pivoted by a compound actuator 17 of a servo system. The longitudinal tape is supported by roller tape guides 50, 51, 52, 53, which are flangeless, while the longitudinal tape is moved longitudinally. With flangeless tape guides, the tape is not laterally constrained in the tape path, and the longitudinal tape tends to rapidly shift from one side of a tape path to the other, and to run at one side of the path for only a short period. The shift at a tape guide 52 at one side of a read/write head 16 may be to the side of the guide opposite to that at the guide 53 at the other side of the read/write head, introducing substantial skew of the longitudinal tape.

The tape data storage drive 10 comprises one or more controls 20 for operating the tape data storage drive, for example, in accordance with commands received from an external system via interface 19. A control typically comprises logic and/or one or more microprocessors 21 with a memory 22 for storing information and program information for operating the logic and microprocessor and the drive. The program information may be supplied to the memory via the interface 19, by an input such as a floppy or optical disk, or by reading from a magnetic tape cartridge, or by any other suitable means. The tape data storage drive 10 may comprise a stand alone unit or comprise a part of a tape library or other subsystem, which may comprise the external system.

Figure 2:
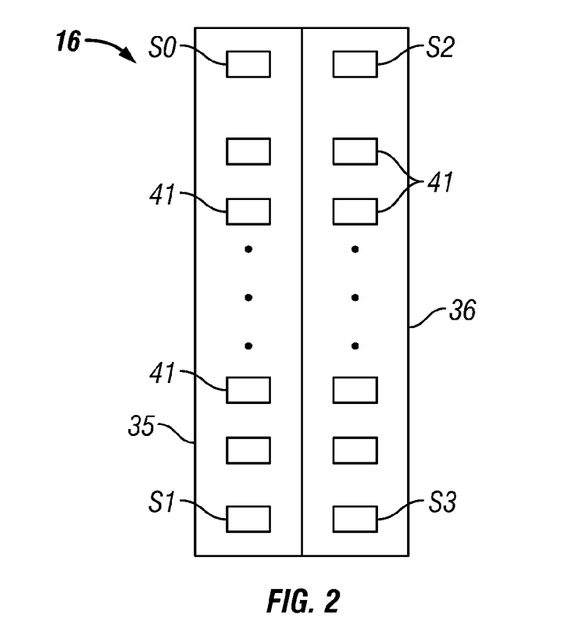
FIG. 2 is a block diagram illustrating a tape head of FIG. 1 having two modules.

Referring additionally to FIG. 2, a typical tape data storage drive 10 operates in both the forward and reverse directions to read and write data. Thus, the read/write head 16 comprises two head modules 35 and 36, having one set of read and write elements 41 on each module. Magnetic tape typically employs read after write to indicate the validity of the written data. Hence, write elements will be on one module that leads in the direction of movement of the longitudinal tape, and read elements at the same data track on the other module trail the write elements. As the result, the read/write head 16 comprises one set of read and write elements on opposite modules for operating in the forward direction and another set for operating in the reverse direction.

Servo read heads (S0, S1, S2, S3) are provided at the ends of the two head modules 35 and 36. During operation, upper servo read head S0 and lower servo read head S1 are utilized for servo control as a longitudinal tape is being wound from a cartridge 12 to take up reel 14 (the forward direction), and upper servo read head S2 and lower servo read head S3 are utilized when the tape is being wound back to the cartridge 12. The servo read heads and the data read and write elements of the two head modules 35, 36 are aligned with each other in the longitudinal direction.

Figure 3:
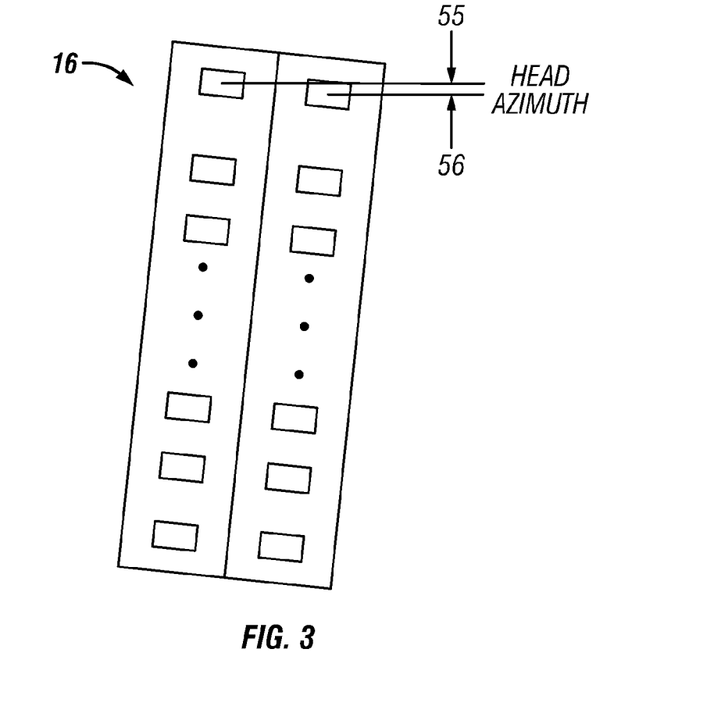
FIG. 3 is a block diagram illustrating the tape head of FIG. 2 in a rotated position.
Figure 4:
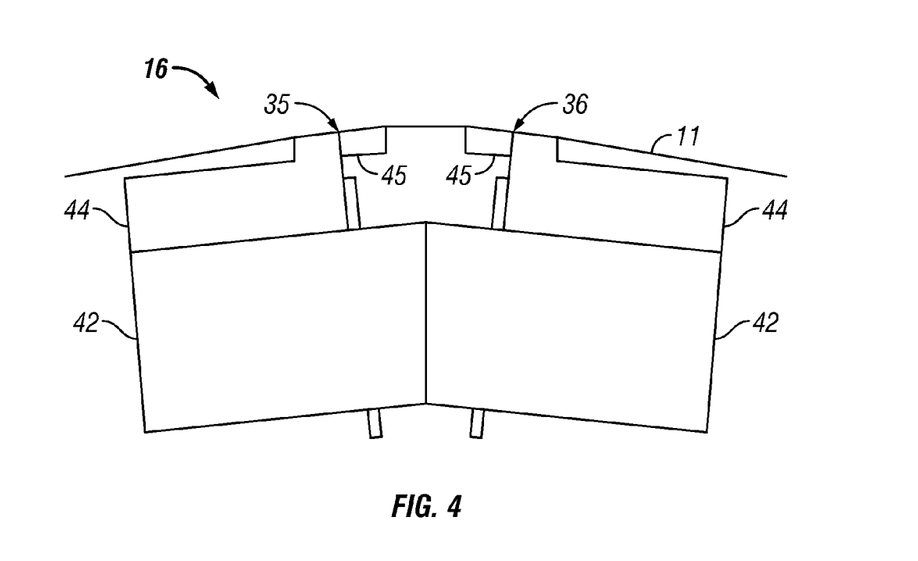
FIG. 4 is a diagrammatic illustration of the top of the tape head of FIG. 1.
Figure 5:
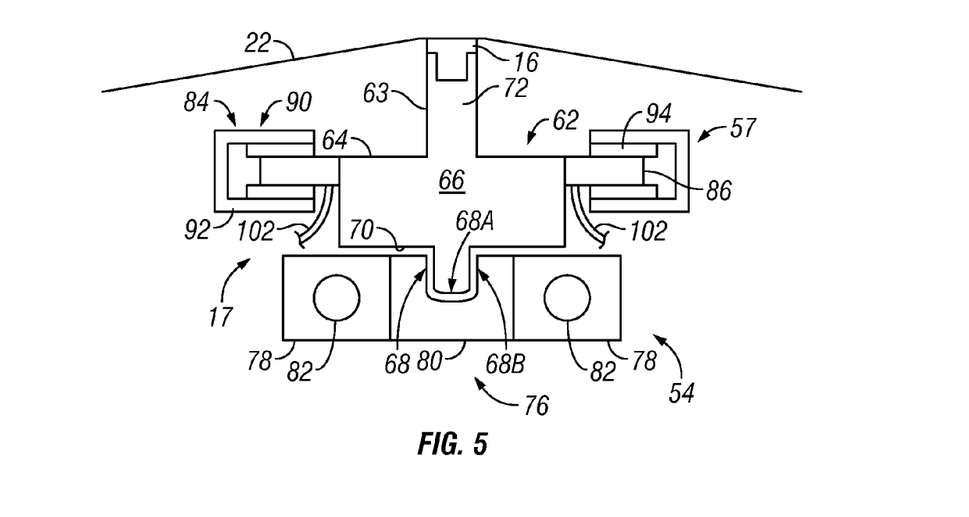
FIG. 5 is a diagrammatic illustration of a skew actuator for the tape head of FIG. 4.

Referring to FIGS. 3, 4 and 5, an example of a two module read/write head 16 comprises a pair of bases 42, each equipped with a module 35, 36. The bases are typically "U-beams" that are adhesively coupled together. Each module comprises a substrate 44 and a closure 45 with read and write elements situated therebetween. The tape head is formed such that a partial vacuum may be created between the longitudinal tape 11 and the modules as the tape is moved longitudinally, for maintaining the tape in close proximity to the read and write elements.

The actuator assembly 17 is arranged to pivot or rotate the read/write head 16 to a desired azimuth, an example comprising azimuth 55, 56, to compensate for skew of the longitudinal tape at the read/write head 16. An example of the actuator assembly 17, such as that described in the incorporated '966 application, comprises a head carriage assembly 62 pivotably coupled to a linear assembly 54, and a voice coil motor (VCM) assembly 57 for moving the head carriage assembly with respect to the linear assembly 54.

The head carriage assembly 62 is configured to support a read/write head 16, and may comprise a head support structure 63 that extends outwardly from a top surface 64 of base plate 66. A pivot bearing assembly 68 may comprise a pivot member 68A that is formed on the bottom surface 70 of the base plate 66 and extends downward from the base plate 66. Correspondingly, a pivot receiver 68B may be formed in the center portion 80 of the support yoke 76, to receive the pivot member 68A, for pivotably coupling the support yoke 76 to the base plate 66, thereby pivotably coupling the head carriage assembly 62 to the linear assembly 54.

The linear assembly 54 comprises a support structure that allows the support yoke 76 to move along rails in apertures 82 of end portions 78 to afford movement of the head carriage assembly 62 transverse to the direction of tape travel. Support structure 63 may comprise a pair of arms 72 that extend outwardly from the base plate 66 and couple to each end of the head 16 for supporting the head.

A coil and magnet assembly 84 of the VCM 57 comprises a coil 86 coupled to each end of the base plate 66. Magnetic pole assemblies 90, each comprising a magnet 94 and at least one pole piece 92 are fixed to, when coils 86 are energized by a current from wires 102 in a synchronized fashion, to move the coils and linear assembly 54 in the linear direction, transverse to the direction of motion of the tape 11; and when coils 86 are energized in opposing fashion, to pivot the head carriage assembly 62 about the direction of head travel to create the desired azimuth angle 55, 56.

Thus, the actuator assembly 17 both moves the tape head 16 laterally with respect to the longitudinal tape 11, and pivots the tape head 16, serving as a skew actuator.

Figure 6:
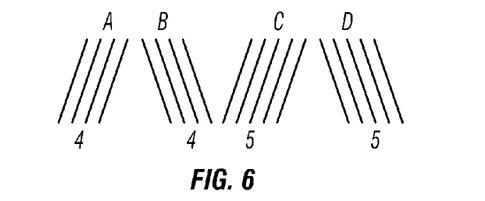
FIG. 6 is a diagrammatic illustration of an exemplary servo pattern of a magnetic tape.

One example of a servo pattern is illustrated in FIG. 6 and comprises a chevron-like pattern of stripes in a linear arrangement. A pattern comprises an A pattern of 4 stripes sloped in a first direction, and a B pattern of 4 stripes sloped in the opposite direction, and a C pattern of 5 stripes sloped in the first direction, and a D pattern of 5 stripes sloped in the opposite direction. The patterns are called a timing based track following servo in that the lateral position of the servo read head is determined by the time to traverse the patterns, the timing varying by lateral position due to the slopes of the stripes. In a specific example, the position error signal (PES) to position the servo read head laterally is developed by precisely measuring the time to traverse from an A to B servo format pattern, and dividing it by the time to traverse from an A to C servo format pattern. These values are detected and then processed by the control to generate a dimensionless ratio of the two values. This ratio provides the exact lateral position of the head relative to the tape. This is a well known system that can determine lateral position to sub-micron accuracy.

Figure 7:
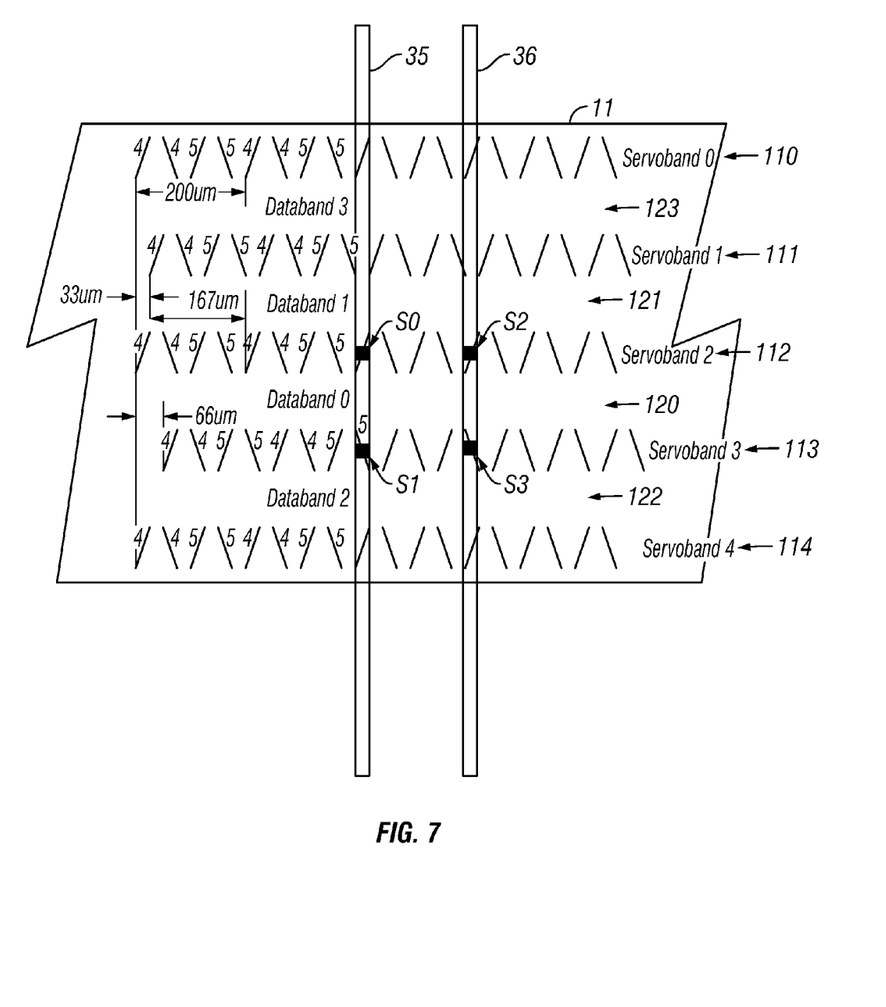
FIG. 7 is a diagrammatic illustration of servo patterns of FIG. 6 arranged in an embodiment of parallel servo tracks of a magnetic tape.

FIG. 7 illustrates an example of a magnetic tape 11 having 5 spaced apart servo tracks 110 (Servoband 0), 111 (Servoband 1), 112 (Servoband 2), 113 (Servoband 3), and 114 (Servoband 4) separating 4 data bands 120 (Databand 0), 121 (Databand 1), 122 (Databand 2), and 123 (Databand 3). In the example, the servo tracks are longitudinally offset from each other at manufacture. This offset provides a means for identifying the servo track(s) currently being read, and therefore identifying the data track at the center of the read/write head, assuming that the read/write head is perpendicular to the tape.

Referring to FIGS. 1, 2, 3 and 7, flangeless tape guides 52, 53 tend to solve the problems of the flanged tape guides, but, without being constrained, the longitudinal tape 11 tends to rapidly shift from one side of a tape path to the other, and may run at one side of the path for only a short period.

The shift at a tape guide 52 at one side of a read/write head 16 may be to the opposite side of the guide 53 at the other side of the read/write head, introducing substantial skew of the longitudinal tape.

Skew may be determined by measuring the longitudinal offset between servo tracks 112, 113 sensed by servo heads S0, S1 at the upper and lower ends of the tape head module 35. As above, the servo tracks may be longitudinally offset at manufacture of the tape to indicate the data band at which the read/write head is positioned. The skew due to a flangeless tape path may be such that it offsets or enhances the manufactured longitudinal offset of the servo tracks, inhibiting the ability to determine the gross lateral positioning of the read/write head, such that the servo system control 20 cannot determine the servo tracks and data band at which it is positioned. Incorrect or unknown gross lateral positioning, in turn, inhibits the ability to employ the use of the servo heads to measure the skew of the tape with respect to the read/write heads, since the manufactured longitudinal offset of the servo tracks is unknown.

Further, the servo skew actuator 17 may have built in biases that cause the read/write head 16 to be in a non-ideal position relative to the servo tracks as a tape is initially moved with respect to the read/write head, for example, when a magnetic tape cartridge 13 is loaded into a data storage drive 10 and the tape 11 is moved across the read/write head. These biases can be caused by the effects of flex cable bias, from biases caused by gravity on the actuator mechanism, form external forces of shock and vibration, and from tape motion forces on the read-write head.

The present invention calibrates a zero reference value representing an indication of an instance when the read/write head 16 is perpendicular to the longitudinal tape 11, employing one servo read head, e.g. servo read head S0, of the first head module, and the servo read head, e.g. servo read head S2, of the second head module, to detect lateral position difference between the servo read heads S0, S2 with respect to the servo track, and calibrating skew misalignment of the servo track with respect to the read/write head. Once the calibration is complete, a value representing the calibrated skew misalignment is stored as a zero reference value; and the servo switches from the one servo read head S0 of the first head module and the servo read head S2 of the second head module, to the two servo read heads S0, S1 of the first head module for track and skew detection.

Figure 8:
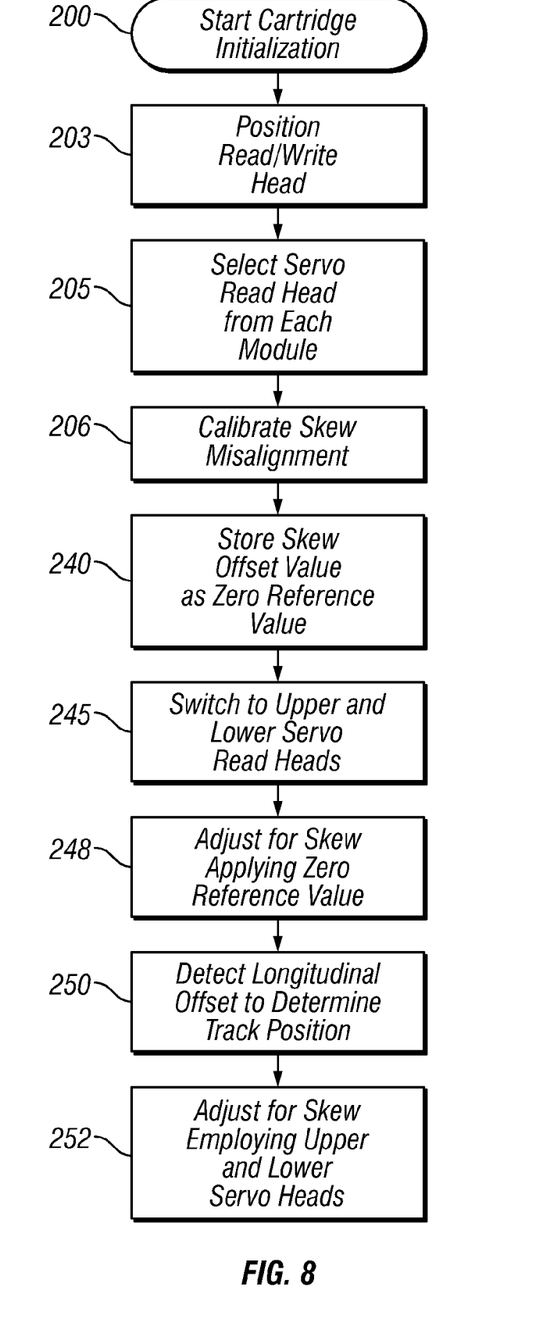
FIG. 8 is a flow chart depicting initialization of a cartridge in the data storage drive of FIG. 1.
Figure 9:
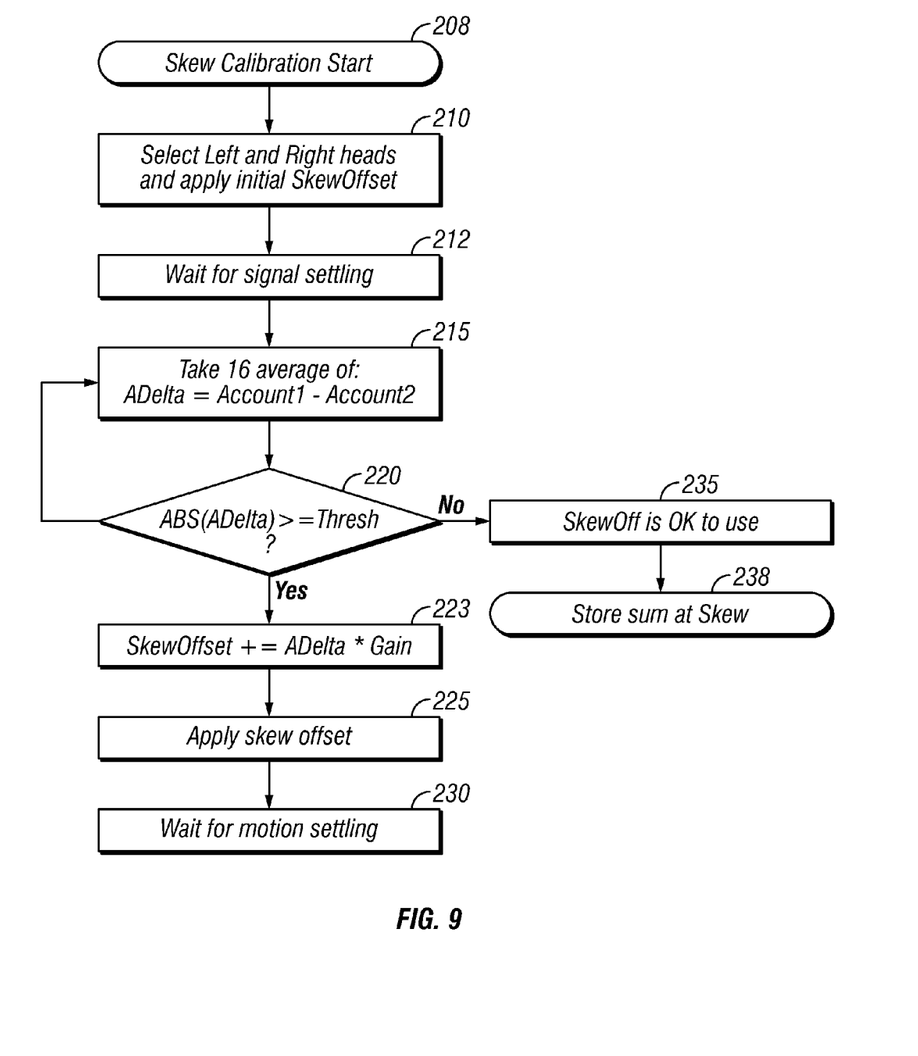
FIG. 9 is a flow chart depicting an exemplary method of calibrating and of adjusting skew misalignment of FIG. 8.

Referring additionally to FIGS. 8 and 9, one embodiment of the calibration process is initiated at step 200, starting cartridge initialization, for example, as a cartridge 13 is loaded into the data storage drive 10, the tape is threaded from the supply reel 12 to the take up reel 14, and the tape 11 is moved across the read/write head 16 at a speed allowing read/write. A number of initialization procedures will be conducted, one of which is that depicted in FIGS. 8 and 9.

In step 203, the actuator assembly 17 is operated by the control 20 to position the read/write head 16 so that at least one servo read head reads a servo track. Steps 205 and 206 represent the process to select a servo read head from each module of the read/write head, and calibrate the skew, represented by the process of FIG. 9, which begins at step 208. In step 210, two servo read heads that are aligned with each other in the longitudinal direction of tape movement, e.g. servo read head S0, of the first head module 35, and the servo read head, e.g. servo read head S2, of the second head module 36, are selected, and an initial skew offset is applied by the actuator 17 to the head 16, if any. The initial skew offset comprises the offset estimated to align the head 16 to be perpendicular to the tape 11. If the servo tracks can be detected and identified by the control, the head is also laterally aligned at Databand 0, such that the selected servo read heads are positioned on Servoband 2. Being at the middle of the tape, Servoband 2 is likely to be the most stable of the servo tracks. Also, the servo tracks (Servobands 2 and 3) have the greatest longitudinal offset with respect to each other. It may be that the identity of a servo track is unknown when the track is detected.

The selected servo read heads read the signal of the servo track at which they are positioned and, in step 212, the control 20 waits for the signal to settle. In step 215, the control 20 takes a number of samples of the servo signals and determines the lateral position of each of the servo heads for each sample, and averages the samples. The average lateral position of the first servo read head S0 is "Acount 1", and the average lateral position of the second servo read head S2 is "Acount 2", and the average lateral positions are compared by subtracting one from the other and the difference is the amount of skew, called "ADelta". "ADelta" is the skew misalignment of the servo track with respect to the read/write head 16 at the time of the measurement.

Step 220 determines whether the absolute value "ABS (ADelta)" of the skew misalignment is sufficiently small that it indicates that the read/write head 16 and servo track are substantially perpendicular to each other. If not, meaning that a threshold value has been met or exceeded, the control 20, in step 223, determines a skew offset that can be applied to actuator 17 to adjust the read/write head. In one embodiment, the skew offset is the "ADelta" value multiplied by a gain. The skew offset determined in step 223 is applied to the actuator 17 in step 225 to pivot the read/write head. In step 230, the control waits for motion settling of the read/write head, and again, in step 215, takes a number of samples of the servo signals of first servo read head S0 and second servo read head S2 and determines the lateral position of each of the servo heads for each sample, and averages the samples. As before, the average lateral positions are compared by subtracting one from the other and the difference is the amount of skew, "ADelta".

If the read/write head 16 has been moved to become, on average, substantially perpendicular to the servo track, the value of "ADelta" is below the threshold of step 220, and the control determines in step 235 that the skew offset has been calibrated and is OK to use. In step 238, the process returns to step 240 of FIG. 8, and the calibrated skew offset value is stored by the control 20 as the zero reference value. The position of the read/write head to be substantially perpendicular to the servo track achieved at step 206 may be called "servo lock". If the threshold is met or exceeded, the loop repeats.

Thus, in one embodiment, the calibrated skew misalignment and zero reference value is the value of the "ADelta"(s) that were used to generate the skew offset signals that, when applied, moved the read/write head to become substantially perpendicular to the servo track. As such, the calibrated zero reference value is related to the detected lateral position difference in accordance with a servo read head of the first head module and a servo read head of the second head module.

Figure 10:
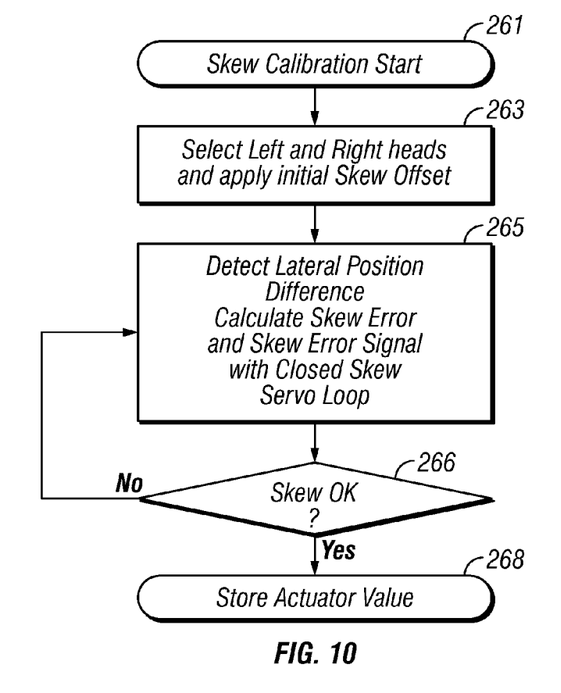
FIG. 10 is a flow chart depicting an alternate method of calibrating and adjusting skew misalignment of FIG. 8.

Referring to FIGS. 8 and 10, in an alternative embodiment, the calibrated skew misalignment and zero reference value is the value of the applied skew offset signal(s) that, when applied, caused the actuator to move the read/write head to become substantially perpendicular to the servo track.

In one example, the skew applied offset signals are calculated as represented by the process of FIG. 10, which begins at step 261. Referring to FIGS. 1, 2, 3, 7 and 10, in step 263, two servo read heads that are aligned with each other in the longitudinal direction of tape movement, e.g. servo read head S0, of the first head module 35, and the servo read head, e.g. servo read head S2, of the second head module 36, are selected, and an initial skew offset is applied by the actuator 17 to the head 16, if any. The initial skew offset comprises the offset estimated to align the head 16 to be perpendicular to the tape 11. If the servo tracks can be detected and identified by the control, the head is also laterally aligned at Databand 0, such that the selected servo read heads are positioned on Servoband 2. Being at the middle of the tape, Servoband 2 is likely to be the most stable of the servo tracks. Also, the servo tracks (Servobands 2 and 3) have the greatest longitudinal offset with respect to each other.

The process to detect the lateral position difference and calculate the skew error may be identical to that of FIG. 9, discussed above, where selected servo read heads read the signal of the servo track at which they are positioned, the control 20 waits for the signal to settle, and the control 20 takes a number of samples of the servo signals and determines the lateral position of each of the servo heads for each sample, and averages the samples. The average lateral position of the first servo read head S0 is "Acount 1", and the average lateral position of the second servo read head S2 is "Acount 2", and the average lateral positions are compared by subtracting one from the other and the difference is the amount of skew, called "ADelta". "ADelta" is the skew misalignment of the servo track with respect to the read/write head 16 at the time of the measurement.

The skew offset required to correct any skew misalignment is calculated in step 265, for example by control 20, and is applied to actuator 17 to adjust the read/write head. In one embodiment, the skew offset is the "ADelta" value multiplied by a gain. The determined skew offset determined is applied to the actuator 17 to pivot the read/write head within a closed servo loop, meaning that there is constant feedback of the lateral position by the first servo read head S0 and second servo read head S2. The skew offset signal is used to close the skew servo which provides an actuator current to rotate and position the actuator 17. A measure of the actuator current is an integration function which is directed by the control 20 to operate a DAC (Digital to Analog Converter) to provide the actuator current. Next, the control waits for motion settling of the read/write head, and again takes a number of samples of the servo signals of first servo read head S0 and second servo read head S2 and determines the lateral position of each of the servo heads for each sample, and averages the samples. As before, the average lateral positions are compared by subtracting one from the other and the difference is the amount of skew, "ADelta". This continues in a closed loop servo system until the read/write head 16 has been moved to become substantially perpendicular to the servo track, perhaps adding current to rotate the actuator more, or subtracting current to rotate the actuator less. The feedback is analyzed in step 266 and ultimately the control determines that the head has been rotated to a position in which the skew offset is now near zero, the skew servo is locked in step 268, and the skew has been calibrated and is OK to use.

In step 268, the process returns to step 240 of FIG. 8, and a value calibrated skew offset value is stored by the control 20 as the zero reference value.

Thus, in the alternate embodiment, the calibrated skew misalignment and zero reference value is the value of the applied skew offset signal that, when applied, caused the actuator to move the read/write head to become substantially perpendicular to the servo track. In one example, the applied skew offset signal is the integration function applied to the DAC by the control 20.

Figure 11:
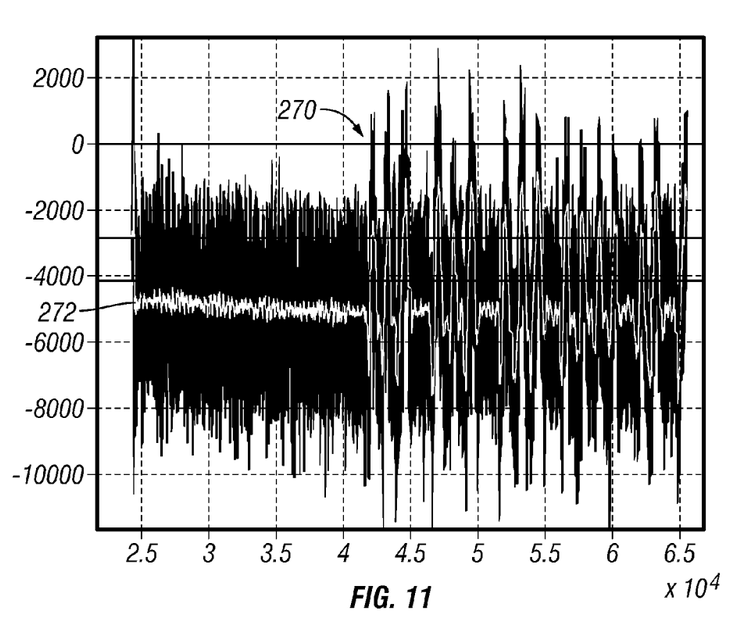
FIG. 11 is an illustration of skew misalignment and skew actuator signals.

FIG. 11 is a plot of the detected lateral position difference 270 and the applied skew offset signal 272 for an example of a magnetic tape data storage head 16 where the magnetic tape is not laterally constrained. As discussed above, without being constrained, the longitudinal tape tends to rapidly shift from one side of a tape path to the other, and to run at one side of the path for only a short period. The shift at a tape path at one side of a read/write head may be to the opposite side of the path which is at the other side of the read/write head, introducing substantial skew of the longitudinal tape.

Thus, averages of the skew are taken as opposed to instantaneous samples alone, and used to determine the zero reference value.

Referring to FIGS. 1, 2, 3 and 8, in step 245, the control unlocks and switches the servo from the one servo read head S0 of the first head module and the servo read head S2 of the second head module, to the two servo read heads S0, S1 of the first head module 35 for track and skew detection. The switch is conducted at electronic speed, so that the servo lock achieved at step 206 with the zero reference value is applied in step 247 and is unlikely to be lost. Should the lock be temporarily lost, the zero reference value is applied in step 247 to force the read/write head 16 into the state of being substantially perpendicular to the servo track.

With the read/write head 16 perpendicular to the servo track, in step 250, the control 20 detects the longitudinal offset between the servo tracks being read by the two servo read heads S0, S1 of the first head module 35. If the control determines that the longitudinal offsets indicate that the read/write head is positioned at the desired data band, for example, at Databand 0, the initialization of the servo is complete. If the control determines that the longitudinal offsets read by the servo read heads indicate that the read/write head is positioned at a different data band, such as Databand 1, the control operates the actuator 17 to move the read/write head laterally of the tape 11 until the longitudinal offsets indicate that the read/write head is positioned, for example, at the desired data band, Databand 0.

The initialization of the servo is complete at step 252, and the control 20 employs the upper and lower servo read heads S0, S1 of the first head module 35 to adjust for skew of the longitudinal tape as the tape is transported past the read/write head 16.

By initially bringing the read/write head to be perpendicular to the servo track and therefore the tape, the skew adjustments of step 252 may be within a smaller track mis-registration (TMR) budget than if the skew adjustment had to be conducted when the cartridge is first initialized and the skew is unknown.

The implementations may involve software, firmware, micro-code, hardware and/or any combination thereof. The implementation may take the form of code or logic implemented in a medium, such as memory 22, and/or circuitry 21 where the medium may comprise hardware logic (e.g. an integrated circuit chip, Programmable Gate Array [PGA], Application Specific Integrated Circuit [ASIC], or other circuit, logic or device), or be accessed via interface 19 from a computer readable storage medium, such as a magnetic storage medium (e.g. an electronic, magnetic, optical, electromagnetic, infrared, or semiconductor system, semiconductor or solid state memory, magnetic tape, a removable computer diskette, and random access memory [RAM], a read-only memory [ROM], a rigid magnetic disk and an optical disk, compact disk—read only memory [CD-ROM], compact disk—read/write [CD-R/W] and DVD).

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A servo detection method for operating a servo detection system for detecting longitudinal servo tracks of a longitudinal tape, said servo detection system comprising at least two servo read heads spaced laterally with respect to a longitudinal tape on a first head module of a read/write head, and at least one servo read head on a second head module of said read/write head spaced longitudinally with respect to said first head module, the method comprising:
   initially sensing a servo track of said longitudinal tape, employing one said servo read head of said first head module and said servo read head of said second head module to detect lateral position difference between said servo read heads with respect to said servo track, and calibrating skew misalignment of said servo track with respect to said read/write head;
   storing a value representing said calibrated skew misalignment as a stored calibrated zero reference value; and
   switching from said one servo read head of said first head module and said servo read head of said second head module, to said two servo read heads of said first head module.

2. The servo detection method of claim 1, wherein said stored calibrated zero reference value is related to said detected lateral position difference.

3. The servo detection method of claim 1, additionally comprising providing a signal to operate a skew actuator for tilting said head modules to adjust sensed skew misalignment to zero, and wherein the value of said stored calibrated zero reference value is related to said skew actuator signal.

4. The servo detection method of claim 1, additionally employing said stored calibrated zero reference value as a servo offset to operate said skew actuator in response to skew sensed by said two servo read heads of said first head module.

5. The servo detection method of claim 1, wherein said servo tracks are longitudinally offset with respect to each other, and said method comprises adjusting sensed skew applying said stored calibrated zero reference value, and employing said servo track longitudinal offset to determine the servo tracks and data band at which said first head module is positioned.

6. The servo detection method of claim 5, additionally comprising, if said servo track longitudinal offset is determined to be less than the maximum longitudinal offset of said servo tracks, repositioning said read/write head laterally to another set of servo tracks.

7. A servo detection system comprising:
   at least two servo read heads spaced laterally with respect to a longitudinal tape on a first head module of a read/write head and configured to read servo tracks of said longitudinal tape;
   at least one servo read head on a second head module of said read/write head spaced longitudinally with respect to said first head module and configured to read a servo track of said longitudinal tape; and
   a servo control configured to initially sense a servo track of said longitudinal tape, employing one said servo read head of said first head module and said servo read head of said second head module to detect lateral position difference between said servo read heads with respect to said servo track, and to calibrate skew misalignment of said servo track with respect to said read/write head; to store a value representing said calibrated skew misalignment as a stored calibrated zero reference value; and to switch from said one servo read head of said first head module and said servo read head of said second head module, to said two servo read heads of said first head module.

8. The servo detection system of claim 7, wherein said stored calibrated zero reference value is related to said detected lateral position difference.

9. The servo detection system of claim 7, wherein said servo control is additionally configured to provide a signal to operate a skew actuator for tilting said head modules to adjust sensed skew misalignment to zero, and wherein the value of said stored calibrated zero reference value is related to said skew actuator signal.

10. The servo detection system of claim 7, wherein said servo control is configured to employ said stored calibrated zero reference value as a servo offset to operate said skew actuator in response to skew sensed by said two servo read heads of said first head module.

11. The servo detection system of claim 7, wherein said servo tracks are longitudinally offset with respect to each other; and said servo control is configured to adjust sensed skew applying said stored calibrated zero reference value, and to employ said servo track longitudinal offset to determine the servo tracks and data band at which said first head module is positioned.

12. The servo detection system of claim 11, wherein said servo control is additionally configured to, if said servo track longitudinal offset is determined to be less than the maximum longitudinal offset of said servo tracks, reposition said read/write head laterally to another set of servo tracks.

13. A servo system, comprising:
at least two servo read heads spaced laterally with respect to a longitudinal tape on a first head module of a read/write head and configured to read servo tracks of said longitudinal tape;
at least one servo read head on a second head module of said read/write head spaced longitudinally with respect to said first head module and configured to read a servo track of said longitudinal tape;
a servo control configured to initially sense a servo track of said longitudinal tape, employing one said servo read head of said first head module and said servo read head of said second head module to detect lateral position difference between said servo read heads with respect to said servo track, and to calibrate skew misalignment of said servo track with respect to said read/write head; to store a value representing said calibrated skew misalignment as a stored calibrated zero reference value; and to switch from said one servo read head of said first head module and said servo read head of said second head module, to said two servo read heads of said first head module; and
a servo skew actuator operated by a signal of said servo control to tilt said head modules to adjust sensed skew misalignment to zero.

14. The servo system of claim 13, wherein said stored calibrated zero reference value is related to said detected lateral position difference.

15. The servo system of claim 13, wherein the value of said stored calibrated zero reference value is related to said skew actuator signal.

16. The servo system of claim 13, wherein said servo control is configured to employ said stored calibrated zero reference value as a servo offset to operate said skew actuator in response to skew sensed by said two servo read heads of said first head module.

17. The servo system of claim 13, wherein said servo tracks are longitudinally offset with respect to each other; and said servo control is configured to adjust sensed skew applying said stored calibrated zero reference value, and to employ said servo track longitudinal offset to determine the servo tracks and data band at which said first head module is positioned.

18. The servo system of claim 17, wherein said servo control is additionally configured to, if said servo track longitudinal offset is determined to be less than the maximum longitudinal offset of said servo tracks, reposition said read/write head laterally to another set of servo tracks.

19. A data storage drive, comprising:
a read/write head configured to read and write data with respect to data of a longitudinal tape, said read/write head additionally comprising at least two servo read heads spaced laterally with respect to a longitudinal tape on a first head module of a read/write head and configured to read servo tracks of said longitudinal tape; and at least one servo read head on a second head module of said read/write head spaced longitudinally with respect to said first head module and configured to read a servo track of said longitudinal tape;
a servo control configured to initially sense a servo track of said longitudinal tape, employing one said servo read head of said first head module and said servo read head of said second head module to detect lateral position difference between said servo read heads with respect to said servo track, and to calibrate skew misalignment of said servo track with respect to said read/write head; to store a value representing said calibrated skew misalignment as a stored calibrated zero reference value; and to switch from said one servo read head of said first head module and said servo read head of said second head module, to said two servo read heads of said first head module; and
a servo skew actuator operated by a signal of said servo control to tilt said head modules to adjust sensed skew misalignment to zero.

20. The data storage drive of claim 19, wherein said stored calibrated zero reference value is related to said detected lateral position difference.

21. The data storage drive of claim 19, wherein the value of said stored calibrated zero reference value is related to said skew actuator signal.

22. The data storage drive of claim 19, wherein said servo control is configured to employ said stored calibrated zero reference value as a servo offset to operate said skew actuator in response to skew sensed by said two servo read heads of said first head module.

23. The data storage drive of claim 19, wherein said detected lateral position difference is derived from averages of samples from said servo read heads.

24. The data storage drive of claim 19, wherein said servo tracks are longitudinally offset with respect to each other; and said servo control is configured to adjust sensed skew applying said stored calibrated zero reference value, and to employ said servo track longitudinal offset to determine the servo tracks and data band at which said first head module is positioned.

25. The data storage drive of claim 24, wherein said servo control is additionally configured to, if said servo track longitudinal offset is determined to be less than the maximum longitudinal offset of said servo tracks, reposition said read/write head laterally to another set of servo track.

* * * * *